3,050,981
VAPORIZATION RATE MEASURING APPARATUS
Helmut J. Schwarz, Somerville, N.J., assignor to Radio Corporation of America, a corporation of Delaware
Filed May 19, 1960, Ser. No. 30,155
10 Claims. (Cl. 73—15)

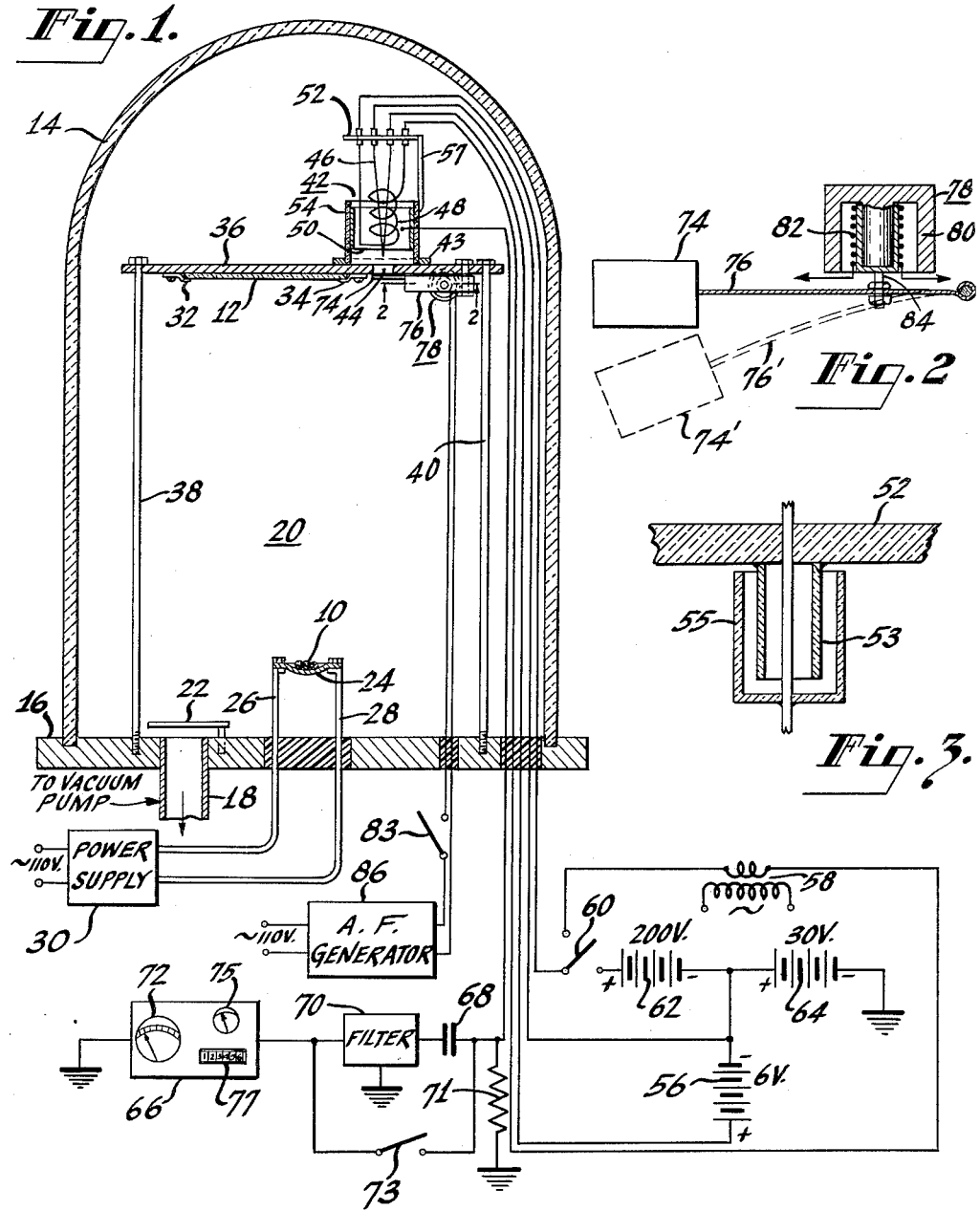
Aug. 28, 1962 — H. J. SCHWARZ — 3,050,981
VAPORIZATION RATE MEASURING APPARATUS
Filed May 19, 1960
INVENTOR.
HELMUT J. SCHWARZ
ATTORNEY > # United States Patent Office 3,050,981
Patented Aug. 28, 1962

This invention relates generally to apparatus for measuring the rate of flow of a gas or vapor, and more particularly to improved apparatus for measuring the rate of vaporization of a material in an environment of reduced pressure. The vaporization rate measuring apparatus of the present invention is particularly useful in measuring the rate of deposition of a vapor of metallic material on a non-metallic substrate during the manufacture of micro-modules of the type used in electronic equipment.

In the manufacture of micro-modules for electronic equipment, it is customary to coat a substrate of electrically insulating material with metal from a vapor of metallic material produced in an evacuated system. Since the metal should be deposited on the substrate in the form of a relatively thin film of a predetermined thickness ranging from a few angstrom units to about 10,000 angstrom units or more, it is important to know the rate of deposition of the metal to monitor the thickness of the deposited metal. Conventional ionization gauges were used in the past to measure the intensity of vaporization of a metal in an evacuated system. Evacuated systems, however, contain some residual gas; and the prior art methods and apparatus for measuring the rate of vaporization of a metal in these systems as a function of total ion current produce inaccurate results. This is because the prior art apparatus ionizes and detects simultaneously both the residual gas and the vaporized metal, and the resultant ion current is measured without distinguishing between the ion current resulting from the positive gas ions and the ion current resulting from the positive metal ions. The term "ion" is used herein to designate a positively charged particle, such as produced in the process of ionization of a gas or vapor, that will be attracted to a negatively charged electrode. The term "ion current" is used to designate the flow of ions in a circuit.

It is an object of the present invention to provide novel apparatus to measure accurately the rate of vaporization of a material in the presence of a gas in an environment of reduced pressure.

Another object of the present invention is to provide novel apparatus for measuring the thickness of a film of material deposited on a substrate in an evacuated system.

In accordance with the present invention, the improved apparatus for measuring the rate of vaporization of a material in an evacuated system comprises in combination an ionization gauge having three electrodes. The electrodes are disposed within a glass tube that is open at both ends. The ionization gauge itself is positioned in the evacuated system so that a stream of vaporized material will pass through the glass tube when the material is vaporized. A shutter is positioned in front of the ionization gauge, and means are connected to the shutter to cause it to oscillate, whereby to cause the stream of vaporized material to pass through the tube in a series of discrete bunches or pulses. Voltage means are connected to the electrodes of the ionization gauge to ionize into ions the vaporized material and to cause the resulting positive ions to be collected at an ion collecting electrode. The ion collecting electrode is coupled to ion current indicating means through a capacitor and preferably a low pass filter to measure the periodically interrupted ion current as a function of the rate of vaporization of the material. The ion current indicating means may include ion current integrating means to indicate the accumulated thickness of deposited material as a function of the total number of vapor ions produced during the deposition process. The steady (direct current) ion current resulting from the ionization of the residual gas in the evacuated system is blocked from the ion current indicating means by the capacitor. This steady ion current, a measure of the amount of gas pressure in the system of reduced pressure, can be read on the ion current indicating means by short circuiting the capacitor and filter, if desired.

The novel features of the present invention, both as to its organization and method of operation, as well as additional objects and advantages thereof, will be more readily understood from the following description, when read in connection with the accompanying drawing, in which the same reference characters are applied to similar parts, and in which:

FIG. 1 is a schematic diagram of apparatus for measuring the rate of vaporization of a material in an evacuated system in accordance with the present invention;

FIG. 2 is an enlarged, cross-sectional view of a portion of the apparatus taken along the line 2—2 of FIG. 1 and showing a shutter and means for oscillating it; and FIG. 3 is an enlarged cross-sectional view of means for preventing certain electrical connections in the ionization gauge shown in FIG. 1 from being short circuited by electrically conductive vapor on portions of the gauge.

Referring, now, to FIG. 1 of the drawing, there are shown means to provide an evacuated system within which a material 10 can be vaporized and its vapor deposited on a substrate 12 in the form of a thin film. To this end, a plate 16 is sealed to the rim of a bell jar 14 by any suitable means to form an airtight seal. A tube 18 passes through the plate 16 and communicates with the interior space 20 of the bell jar 14. The tube 18 is connected to a vacuum pump (not shown) to evacuate the interior space 20. A baffle plate 22 is disposed over the open end of the tube 18, by any suitable means, to protect the vacuum pump from foreign matter. The interior space 20 of the bell jar 14 may be evacuated of practically all of the gas therein to provide a suitable environment wherein the material 10 can be heated to vaporization.

The material 10 is a vaporizable substance, such as copper, silver, silicon monoxide, and the like, and is supported in an electrically conductive boat 24, preferably of a material having a high melting point, such as tungsten. The material 10 may be metallic or non-metallic. Means are provided to heat the boat 24 by passing a current therethrough. To this end, the boat 24 is electrically connected between electrical conductors 26 and 28. The conductors 26 and 28 pass through the plate 16 and are connected to a suitable power supply 30. Current passing through the metallic boat 24 will cause it to heat to a temperature that will vaporize the material 10. The vaporized material will condense on objects, such as the substrate 12, within the interior space 20.

The substrate 12 may comprise a sheet of electrically insulating material, such as a ceramic wafer. The substrate 12 is supported within the interior space 20 by clamps 32 and 34 that depend from a plate 36. The plate 36 is supported in a horizontal position, above the plate 16, by vertical rods 38 and 40. It will now be understood that vapor from the material 10 will condense on the surface of the substrate 12 that faces the material 10 when the latter is vaporized.

An ionization gauge 42 is supported, as by a ring 43, on the upper surface of the plate 36 over an opening 44 in the plate 36 for a purpose hereinafter appearing. The ionization gauge 42 comprises a filament 46, a grid 48 and a collector 50. The cathode 46 and the grid 48 depend from electrical conductors that pass through a plate 52 of insulating material, such as glass. The collector 50 comprises an electrically conductive ring disposed against the inner wall of a glass tube 54. The glass tube 54 is open at both ends and its axis is aligned with the opening 44 in the plate 36. The glass plate 52 is fixed to the glass tube 54 by means of a rod 57.

The electrodes of the ion gauge 42 are energized to ionize any gas and vapor into ions and to attract these ions to the collector electrode because of a negative voltage on the collector electrode. Thus, the filament 46 is connected to a source of voltage 56, illustrated as a 6 volt battery. When a single pole, double throw switch 60 is in one position (with the switch arm vertical as viewed in FIG. 1), the grid 48 is connected to a source of alternating voltage through the switch 60 and a transformer 58. This circuit is used to de-gas the grid 48 in accordance with known practice. In the second position of the switch 60 (with the switch arm horizontal as viewed in FIG. 1), the grid 48 is connected to a source of positive potential 62, illustrated as a 200 volt battery. The negative terminals of the batteries 56 and 62 are connected to each other and to the positive terminal of a source of unidirectional voltage 64, illustrated as a 30 volt battery. The negative terminal of the battery 64 is connected to a common terminal, such as ground. The values of components given herein are illustrative, and they are not to be considered in a limiting sense.

The collector 50 is coupled to ion current indicating apparatus 66, of known design, through alternating current coupling means (direct current blocking means) comprising a series circuit of a capacitor 68 and a low pass filter 70. An amplifier (not shown) may be used in this circuit, if desired. The ion current indicating apparatus 66 has a common terminal that is connected to a common connection, such as ground. The collector 50 is also connected to ground through a resistor 71 for producing signals thereacross. A meter 72 for indicating the rate of ion current flow is part of the ion current indicating apparatus 66. The ion current indicating apparatus 66 also comprises an ion current integrating circuit of any of a number well known in the art and includes a meter 75 and a totalizer 77 for indicating the integrated ion current over a period of time. Suitable ion current indicating apparatus is described in an article, "A Combined Current Indicator and Integrator" by Higinbotham and Rankowitz in the "Review of Scientific Instruments," September 1951, volume 22, pages 688–690; and in an article, "Isolated Power Supplies Minimized Drift Aid D.C. Coupling" in "Electrical Design News," February 1960, pages 24–25. Such an arrangement permits the monitoring of the thickness of a deposited film of vapor material during the process of vapor deposition.

The capacitor 68 and the filter 70 may be short circuited by a switch 73 to indicate the degree of vacuum in the interior space 20, as will hereinafter be explained.

To distinguish the ion current resulting from the ionized, vaporized material 10 from the ion current resulting from any ionized, residual gas within the interior space 20 of the bell jar 14, means are provided to pass the vaporized material 10 through the ion gauge 42 in a series of discrete bunches, or pulses, of preferably relatively low frequency. To this end, a shutter 74 is disposed just below the opening 44 in the plate 36. The shutter 74 is fixed to one end of a flexible rod 76, and the other end of the rod 76 is fixed to the plate 36 by any suitable means, as shown in FIG. 3. A loud speaker motor 78 has its magnetic yoke 80 fixed to the underside of the plate 36, by any suitable means (not shown). The voice coil 82 of the speaker motor 78 is fixed to the flexible rod 76 by means of a pin 84. An alternating voltage source, such as an audio frequency generator 86, is connected across the voice coil 82 through a switch 83. Thus, the shutter 74 may be made to oscillate the uncover periodically the opening 44 in the plate 36. With the aid of the oscillating shutter 44, a series of discrete bunches, or pulses, of the vaporized material 10 can be passed through the tube 54 of the ionization gauge 42. The extent of motion of the shutter 44 during each period of oscillation is indicated by the dashed outline 74' and 76' of the shutter and its connecting flexible rod, as shown in FIG. 2.

Since the vapor of the material 10, if electrically conducting, will tend to short-circuit the conductors supporting the cathode 46 and the grid 48 of the gauge 42, special insulating means are provided to prevent this tendency. Thus, each of the conductors passing through the support 52 of the gauge 42 is surrounded by an insulating tube 53 depending from the lower surface of the support 52. Fixed to each conductor passing through the plate 52 is an upwardly extending insulating cup 55. The insulating cup 55 is disposed concentrically with the insulating tube 53 and is spaced from the support 52 and the tube 53. With this arrangement, electrically conductive vapors are prevented from condensing on the portions of the support 52 that are adjacent to the conductors supported by the support 52, thereby preventing the conductors from being short circuited to each other.

The operation of the apparatus to indicate the rate of vaporization of the material 10 in the interior space 20 will now be explained: The boat 24 is heated by current from the power supply 30 to a temperature sufficient to vaporize the material 10. The loud speaker motor 78 is energized from the audio frequency generator 86 at a relatively low frequency, say 20 cycles per second by way of example. Thus, the shutter 74 will correspondingly uncover the opening 44 in the plate 36 periodically and permit a series of bunches, or pulses, of vaporized material 10 to pass through the ionization gauge 42. The vapor of the material 10, as well as the residual gas in the interior space 20, will be ionized by the voltage applied between the cathode 46 and the grid 48 of the ionization gauge 42. The ions of the ionized vapor and the ionized gas will be attracted to the collector 50, the ion collecting electrode, when switch 60 is connected to the battery 62. With the switch 73 in the open position, only the (interrupted) ion current resulting from the periodically ionized vapor of the material 10 will pass through the blocking capacitor 68, the filter 70 and the ion current indicating apparatus 66 because of the alternating current characteristics of pulsed current. The rate of interrupted ion current will be indicated on the meter 72. The meter 72 may be calibrated, for a given material 10, directly in terms of amount of material vaporized per unit of time, as, for example, grams per second. The frequency response of the filter 70 should preferably be such that it passes a maximum signal at the frequency of the periodically interrupted ion current caused by the oscillation of the shutter 74, and rejects other frequencies.

If it is desired to monitor the thickness of the film of vaporized material 10 that is being built up on the substrate 12, the interrupted ion current can be integrated by the ion current measuring apparatus 66. The thickness of the deposited film will be directly proportional to the integrated ion current. The meter 75 and the totalizer 77 can be calibrated in terms of integrated quantities of ion current.

In accordance with the present invention, the ion current resulting from the ionization of the residual gas in the evacuated system does not affect the ion current resulting from the ionization of the vaporized material 10 because the ions of residual gas flow in a steady current and are blocked by the capacitor 68. To measure the degree of vacuum, that is, the pressure of the residual gas in the interior space 29, the switch 73 is closed to short circuit the capacitor 68 and the filter 70. The ion indicating apparatus 66 will then record the steady flow of gas ions as a function of the degree of vacuum in the evacuated system. The meter 72 may also be calibrated in units of pressure to indicate the degree of vacuum in the interior space 20.

From the foregoing description, it will be apparent that there has been provided improved apparatus for measuring the rate of vaporization of a material in the presence of a gas. The ionization gauge of the improved apparatus ionizes both the gas and the vapor, and the ion current resulting from the ionized, vaporized material is distinguished from the ion current resulting from the ionized gas by providing the former ion current with alternating current characteristics, the latter ion current having direct current characteristics. While the ion current measuring apparatus may be the same for measuring a steady ion current or an alternating ion current, the steady ion current can be blocked by a capacitor, while the alternating ion current is permitted to pass to the ion current indicating means. Also, if it is desired to control the rate of vaporzation and/or the quantity of vaporized material to be deposited on a substrate, feedback means, well known in the art, may be connected between the ion current indicating apparatus and the power supply that heats the material to be vaporized in order to maintain a predetermined rate of vaporization and/or to interrupt the vaporizing process after a predetermined period of time.

What is claimed is:

1. In an evacuated system having a gas at a relatively low pressure and wherein a material is vaporized into a vapor stream, means to measure the rate of vaporization of said material comprising an ionization gauge, means to dispose said ionization gauge in said vapor stream, means to interrupt periodically said vapor stream to said ionization gauge, said ionization comprising means to ionize said interrupted vapor stream and said gas into ions, ion current indicating means, and direct current blocking means connecting said ndicating means to said ionization gauge to cause said ions from said periodically interrupted vapor stream to flow therethrough whereby to measure the ion current of said vapor ions as a function of said rate of vaporization of said material.

2. A system as set forth in claim 1 wherein said direct current blocking means comprises a capacitor and a filter connected in series with each other, said filter being adapted to pass ion current of the frequency of said periodically interrupted vapor stream.

3. In an evacuated system having a gas at a relatively low gas pressure and wherein a material is vaporized into a vapor stream, means to measure the rate of vaporization of said material comprising an ionization gauge, means to dispose said ionization gauge in said vapor stream, means to interrupt periodically said vapor stream to said ionization gauge, said ionization gauge comprising means to ionize said interrupted vapor stream and said gas into ions, ion current indicating means, direct current blocking means connecting said indicating means to said ionization gauge to cause said ions from said periodically interrupted vapor stream to flow therethrough whereby to measure the ion current of said vapor ions as a function of said rate of vaporization of said material, and means connected in parallel with said direct current blocking means to bypass said direct current blocking means whereby to measure the ion current of said gas ions as a function of said gas pressure when only said gas is present in said evacuated system.

4. Apparatus for measuring the rate of deposition of a vaporized material on a substrate from a vapor stream of said material in an evacuated system, said apparatus comprising an ionization gauge, means to position said ionization gauge in a portion of said vapor stream, said ionization gauge being formed with front and rear openings through which said vapor stream may pass, said ionization gauge comprising electrodes for ionizing said vapor stream into ions and anode means for collecting said ions, oscillating means disposed in front of said front opening of said ion gauge to interrupt periodically the flow of said vapor stream through said ionization gauge whereby to cause said vapor stream to be ionized into a series of pulses of ions, ion current indicating means including direct current blocking means, and means to couple said anode means to said ion current indicating means to measure only the ion current resulting from said series of pulses of ions.

5. Apparatus as set forth in claim 4 wherein said ion current indicating means comprises means to integrate said ion current over a period of time.

6. In an evacuated system containing a residual gas, in combination, an ionization gauge for ionizing a vapor of material flowing therethrough in the presence of said residual gas, said ionization gauge comprising a cathode, a grid and a collector, means to apply a voltage to said cathode to heat said cathode, means to apply a voltage between said grid and said cathode so that said grid is positive with respect to said cathode whereby emission from said cathode will ionize said vapor into ions, means to apply a voltage to said collector that is negative with respect to said cathode whereby to attract said ions of said vapor, means to interrupt periodically the flow of vapor through said ionization gauge whereby to ionize said vapor into a series of pulses of ions, ion measuring means, and means to couple capacitively said anode to said ion measuring means to measure only the ion current resulting from said pulses of ions.

7. The combination as set forth in claim 6 wherein said coupling means comprises a filter having a frequency response adapted to pass said ion current resulting from said pulses of ions.

8. Apparatus for measuring selectively the pressure of a gas in a closed system or the rate of vaporization of a material in the presence of said gas in said closed system, said apparatus comprising an ionization gauge, means to vaporize said material into a stream of vapor, means to apply energizing voltages to said ionization gauge to ionize said gas and said vapor into ions and to collect said ions, ion current indicating means, a capacitor, means to connect said ion current indicating means to said ion collecting means of said ionization gauge through said capacitor whereby to block steady ion current and to pass interrupted ion current, means disposed in said stream of vapor between said material and said ionization gauge to interrupt periodically said stream of vapor from said material to said ionization gauge whereby to cause said ionization gauge to ionize said vapor in a series of pulses of ions, said ion current indicating means being calibrated to indicate said rate of vaporization, switching means, and means connecting said switching means in parallel with said capacitor to bypass said capacitor at will whereby to measure the steady ion current from said gas in the absence of interrupted ion current from said vapor.

9. Apparatus as set forth in claim 8 wherein said means connecting said ionization gauge to said ion current indicating means through said capacitor comprises a filter circuit having a frequency response in the region of the frequency of said series of pulses of ions.

10. Apparatus for measuring the rate of flow of a first gas in a closed system in the presence of a second gas in said closed system, said apparatus comprising an ionization gauge, means to position said ionization gauge so that said first gas flows therethrough, means to interrupt periodically at a predetermined frequency the flow of said first gas through said ionization gauge whereby said first gas will flow through said ionization gauge in a series of pulses of said first gas, means connected to said ionization gauge to ionize any said first and said second gases therein into ions and to collect said ions, ion current indicating means, and direct current blocking means connected between said ion collecting means of said ionization gauge and said ion current indicating means to pass only interrupted ion current resulting from the ionization of said series of pulses of said first gas and to block steady ion current resulting from the ionization of said second gas.

References Cited in the file of this patent

UNITED STATES PATENTS

| | | |
|---|---|---|
| 2,275,748 | Fearon | Mar. 10, 1942 |
| 2,491,445 | Cunningham et al. | Dec. 13, 1949 |
| 2,752,882 | Heimann | July 3, 1956 |
| 2,848,635 | Raible et al. | Aug. 19, 1958 |

Disclaimer 3,050,981.—*Helmut J. Schwarz*, Somerville, N.J. VAPORIZATION RATE MEASURING APPARATUS. Patent dated Aug. 28, 1962. Disclaimer filed Apr. 17, 1963, by the assignee, *Radio Corporation of America*.
Hereby enters this disclaimer to claims 1 through 10 of said patent.
[*Official Gazette June 4, 1963.*]